(12) United States Patent
Kurihara et al.

(10) Patent No.: US 6,928,420 B1
(45) Date of Patent: Aug. 9, 2005

(54) AUTOMATED TRANSACTION APPARATUS

(75) Inventors: Makoto Kurihara, Kawasaki (JP); Kenji Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 09/667,440

(22) Filed: Sep. 22, 2000

(30) Foreign Application Priority Data

Mar. 30, 2000 (JP) .............................. 2000-095122

(51) Int. Cl.[7] ........................................... G06F 17/60
(52) U.S. Cl. ..................... 705/64; 705/43; 705/39; 705/26; 235/380; 380/33; 380/278
(58) Field of Search .................. 705/43, 39, 26, 705/44, 64; 235/379, 380, 381; 380/278, 380/283, 255, 33; 709/219; 379/91.01

(56) References Cited

U.S. PATENT DOCUMENTS

| | | | |
|---|---|---|---|
| 5,727,163 A | | 3/1998 | Bezos |
| 5,809,144 A | * | 9/1998 | Sirbu et al. ................. 705/53 |
| 5,822,737 A | * | 10/1998 | Ogram ....................... 705/26 |
| 5,899,980 A | * | 5/1999 | Wilf et al. .................. 705/26 |
| 5,905,908 A | | 5/1999 | Wagner |
| 6,363,525 B1 | * | 3/2002 | Dougherty et al. ......... 725/34 |

FOREIGN PATENT DOCUMENTS

| | | |
|---|---|---|
| EP | 0590861 A2 * | 4/1994 |
| EP | 0 813 325 A2 | 12/1997 |
| JP | 2-60337 | 2/1990 |
| JP | 3-225555 | 10/1991 |
| JP | 11-53449 | 2/1999 |
| JP | 11-316788 | 11/1999 |
| NL | 1007409 * | 11/1997 |
| WO | WO 96/00485 * | 1/1996 |
| WO | WO 99/23617 | 5/1999 |
| WO | WO 00/55777 | 9/2000 |

OTHER PUBLICATIONS

Bloom, Jennifer Kingson, "First Virtual foes off-line to secure on-line payments", Feb. 18, 1997, American Banker, Colume: 162, No.: 32, p.: 16A(3).*

European Search Report for corresponding European Application dated Apr. 16, 2002.

* cited by examiner

Primary Examiner—F. Zeender
(74) Attorney, Agent, or Firm—Armstrong, Kratz, Quintos, Hanson & Brooks, LLP

(57) ABSTRACT

An automated transaction apparatus capable of connecting to both a private line and a commercial line. Therefore, by using a private line to communicate data requiring high security, it is possible to provide a variety of services, which utilize commercial lines including the Internet, without encrypting the data.

2 Claims, 8 Drawing Sheets

FIG. 12

```
ADDRESS
Input delivery address
TEL
Input telephone number
BACK        ENTER
```

FIG. 13

```
Please confirm the transaction

Name of merchandise   ・・・・
Quantity              ・・
Purchase price        ・・・・
Delivery address      ・・・・・・・
Telephone number      ・・・・・

BACK        Confirm
```

AUTOMATED TRANSACTION APPARATUS

BACKGROUND OF THE INVENTION

1. Field of the Invention

The present invention relates to an automated transaction apparatus which is installed at a financial institution, a convenience store, or the like, for processing cash deposit/withdrawal transactions and merchandise sales transactions.

2. Description of the Related Art

An automated transaction apparatus is an ATM (Automatic Teller Machine), which is installed at a financial institution, or an automatic merchandise sales machine, which is installed at a convenience store or the like. An automated transaction apparatus is connected via a communications line to a host computer, and transacts business with a user while communicating with the host computer. In general, since an ATM requires high security, it is connected via a private line to a host computer of a financial institution. Conversely, because an automatic merchandise sales machine provides a variety of services, it is connected via a commercial line to the Internet, and communicates with a Web server over the Internet.

However, since an automatic merchandise sales machine is connected to a commercial line, data requiring high security, such as a user's credit card number, must be encrypted. Furthermore, because an ATM is connected to a private line, high security is ensured, but the ATM is not capable of providing a variety of services using the Internet.

SUMMARY OF THE INVENTION

Accordingly, an object of the present invention is to provide an automated transaction apparatus capable of providing a variety of services while ensuring high security.

To achieve the above-mentioned object, in the present invention there is provided an automated transaction apparatus capable of connecting to both a private line and a commercial line. Therefore, by using a private line to communicate data requiring high security, it is possible to provide a variety of services which utilize commercial lines including the Internet, without encrypting the data.

Preferably an automated transaction apparatus of the present invention is an automated transaction apparatus for processing a transaction with a user including at least a first process and a second process, comprising a line unit for enabling communication with a first data processing device connected via a private line, and a second data processing device connected via a commercial line including the Internet; and a controller for selecting the first data processing device for the first process and the second data processing device for the second process, and controlling the transactions in accordance with the selected data processing device in each process.

Furthermore, in the above invention, the controller is preferably constructed such that it encrypts data related to the transaction requiring processing by the first data processing device, generates an encryption key for decoding the encrypted data, sends the encryption key to the first data processing device, sends the encrypted data to the second data processing device, and causes the second data processing device to send the encrypted data to the first data processing device.

Alternatively, the controller may be constructed such that it encrypts data related to the transaction requiring processing by the second data processing device, generates an encryption key for decoding the encrypted data, sends the encryption key to the first data processing device, sends the encrypted data to the second data processing device, and causes the first data processing device to send the encryption key to the second data processing device.

In this manner, even when encrypted data is sent via a commercial line, because an encryption key for decoding same is sent via a private line, the high security of the data is guaranteed.

BRIEF DESCRIPTION OF THE DRAWINGS

FIG. 12 is an example of a screen displayed on an automated transaction apparatus during the transaction processing;

FIG. 13 is an example of a screen displayed on an automated transaction apparatus during the transaction processing;

DESCRIPTION OF THE PREFERRED EMBODIMENTS

Embodiments of the present invention will be explained below.

Figure 1:
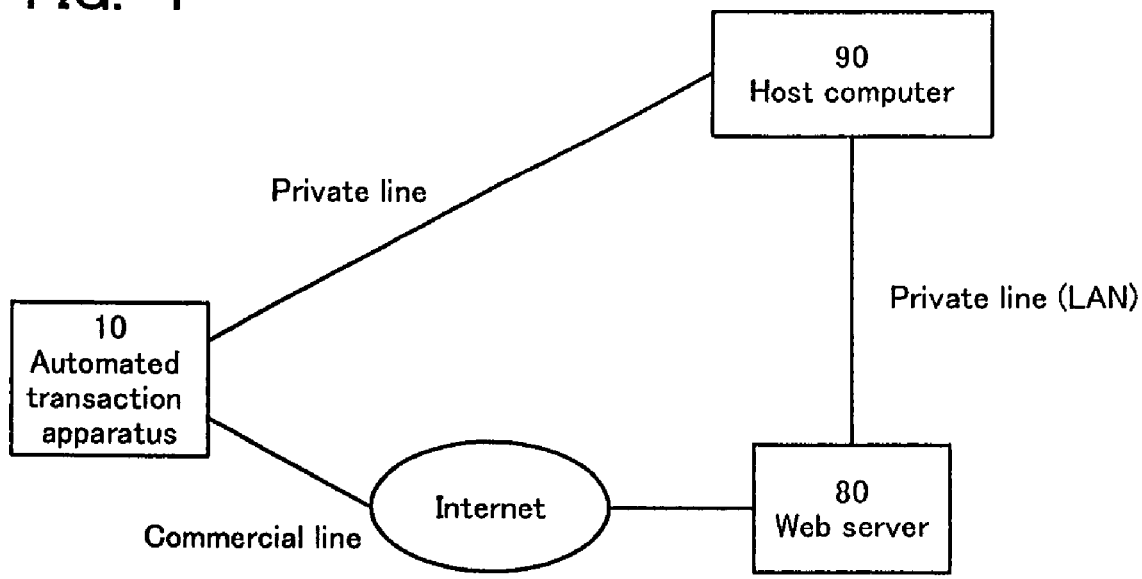
FIG. 1 is a diagram illustrating the principle of the present invention.

FIG. 1 is a diagram illustrating the principle of the present invention. An automated transaction apparatus of the present invention uses both a private line and a commercial line. An automated transaction apparatus 10 connects to a host computer 90 of a financial institution via a private line for communicating data that requires high security, such as a cash deposit/withdrawal transaction, personal identification number (PID), or credit card number. Further, the automated transaction apparatus 10 connects to a Web server 80 on the Internet via a commercial line for various types of sales transactions. The automated transaction apparatus 10 uses the private line and the commercial line by switching in accordance with the process of each transaction.

Figure 2:
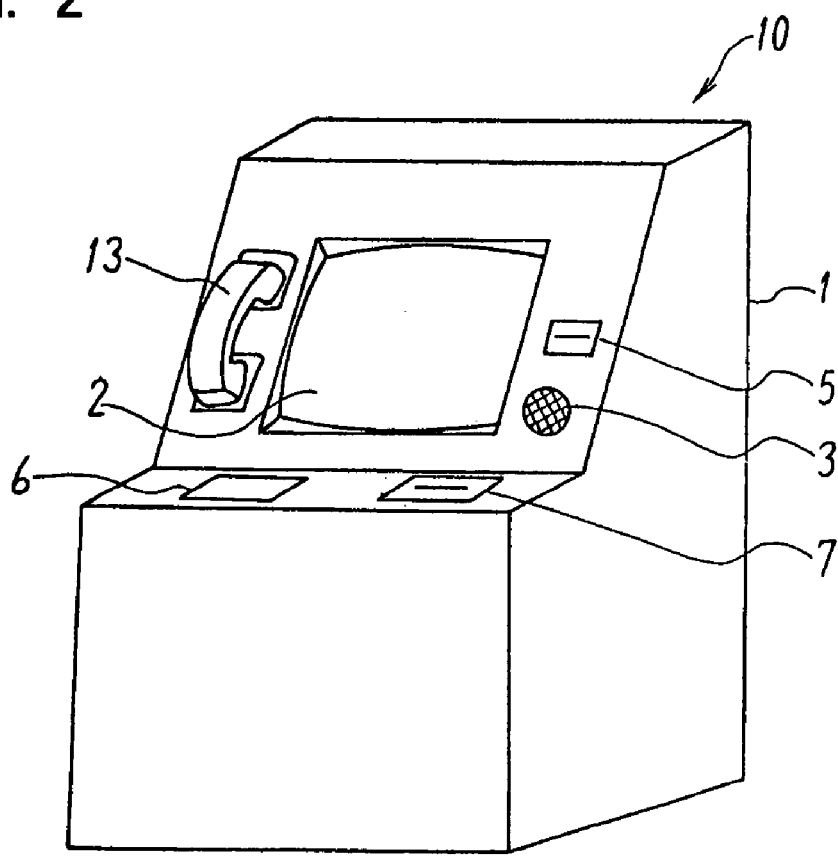
FIG. 2 is a perspective view of an automated transaction apparatus 10 in a first embodiment of the present invention.

FIG. 2 is a perspective view of an automated transaction apparatus 10 in the first embodiment of the present invention. In this embodiment, an automated transaction apparatus which performs sales transactions of various kinds of merchandise (computer game software, travel packages, tickets, and the like) in addition to cash transactions will be explained. A touch panel, for example, is disposed as an inputting means in the screen 2 located on the main body 1 of automated transaction apparatus 10.

The main body 1 is provided with a card inserting/returning slot 5 for a cash card, or credit card, a cash inserting/dispensing slot 6, and a receipt issuing slot 7. Further, a speaker 3 is provided to output voice data regarding transaction guidance, warnings, etc. In addition, the automated transaction apparatus may be provided with an automatic calling telephone 13 for a user to make inquiries regarding a transaction. A transaction is initiated by insertion of a user card into the card inserting/returning slot 5 by a user. A user, while looking at the screen, proceeds with a transaction by touching a prescribed unit on the screen, and performing a prescribed input operation.

Figure 3:
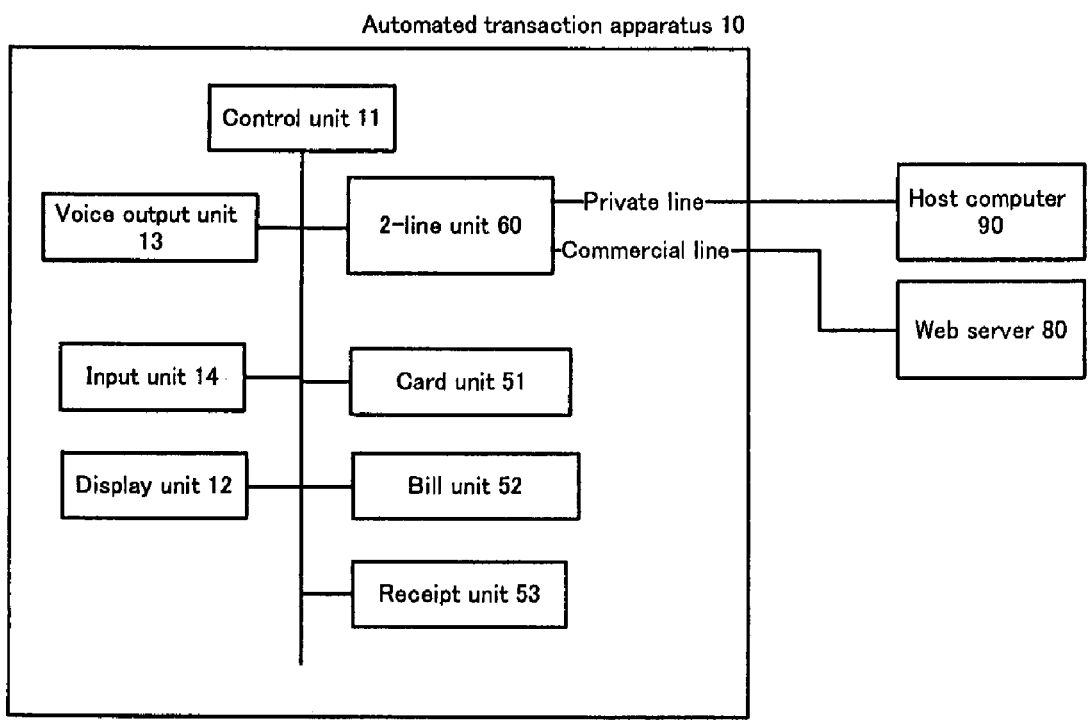
FIG. 3 is a block diagram of an automated transaction apparatus 10.

FIG. 3 is a block diagram of the automated transaction apparatus 10 of FIG. 2. A two-line unit 60 of an automated transaction apparatus of the present invention has two lines, including a private line and a commercial line. The automated transaction apparatus 10 connects via the private line to a host computer 90 of a financial institution or the like, which provides cash transaction services, and connects via a commercial line to a Web server 80 on the Internet, which provides merchandise sales transaction services. First, a case in which a user utilizes an automated transaction apparatus 10 to make either a cash deposit or a withdrawal will be explained while referring to FIG. 3. With regard to a cash deposit/withdrawal transaction, an automated transaction apparatus 10 executes a transaction while exchanging messages with a host computer 90 via a private line, the same as in the past. Each transaction process is stored as a program in memory inside a control unit 11, and transaction contents, which conform with a transaction process, are displayed on a screen 2 of a display unit 12 in accordance with a CPU inside the control unit 11 executing this program. Then, based on data inputted from an input unit 14 (for example, a touch panel provided on the screen 2), a card unit 51, bill unit 52, and receipt unit 53 operate. The card unit 51 reads the magnetic stripe of a card inserted from a card inserting/returning slot 4. The bill unit 52 either stores in a storage unit bills loaded from a cash inserting/dispensing slot 6, or discharges bills from the storage unit to the cash inserting/dispensing slot 6. The receipt unit 53 issues a receipt for transaction confirmation from a receipt issuing slot 7. Further, a voice output unit 13 outputs voice data from a speaker.

In the case of a cash deposit/withdrawal transaction, a user inserts a cash card into the card inserting/returning slot 5. Information, such as the user's account number and so forth, are read by the card unit 51 from a magnetic stripe attached to the cash card. Then, in the case of a deposit transaction, the user loads bills into the cash inserting/dispensing slot 6. When this is done, the bill unit 52 counts the amount of bills received. Then, the control unit 11 executes internal processing for a deposit transaction with regard to transaction data, such as the user's account number and the amount of money received, while exchanging messages with a remote host computer 90 via the two-line unit 60.

Then, when this processing is complete, the cash card is returned via the card inserting/returning slot 5, and an itemized transaction receipt is issued from the receipt issuing slot 7.

Conversely, in the case of a withdrawal transaction, after insertion of a cash card, the user inputs a personal identification number, and a withdrawal amount, which are inputted from an input unit 14. The control unit 11 exchanges messages via a private line with a host computer 90, and performs a withdrawal operation based on information, such as the user's account number, amount of withdrawal, and so forth, the same as described above. Then, the bill unit 52 extracts the withdrawal amount's worth of bills from the storage unit inside the automated transaction apparatus 10, and discharges these bills to the cash inserting/dispensing slot 6.

The user receives the cash therefrom and, as described above, also receives his card and a receipt.

Figure 4:
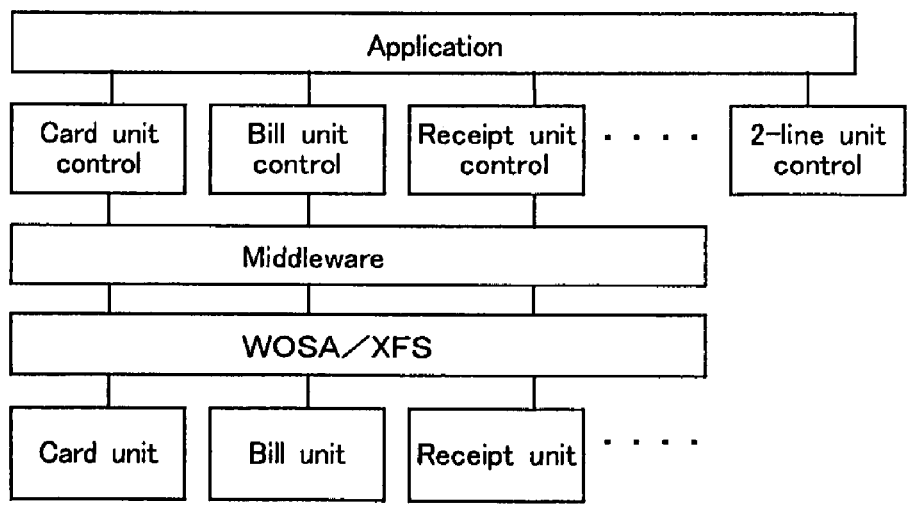
FIG. 4 is a diagram showing the hierarchical structure of software in an automated transaction apparatus.

FIG. 4 is a diagram showing the hierarchical structure of software inside an automated transaction apparatus 10. In FIG. 4, WOSA/XFS is a common interface for each of the units, such as the card unit 51, bill unit 52, and receipt unit 53, which constitute an automated transaction 15 apparatus 10. Thereabove is middleware, and above that are unit control programs for controlling each unit. The two-line unit 60 is controlled by a two-line unit control program. An application program is the uppermost level program, which manages each unit control program. The application program detects each process during a transaction (for example, a deposit process, withdrawal process, merchandise selection process, and so forth) by an operational definition called a state. Then, in the case of a state that requires a private line (a deposit/withdrawal process or the like), the application program selects a private line for the two-line unit control program, and in the case of a state requiring a commercial line (merchandise selection process or the like) selects a commercial line.

Next, a merchandise sales transaction using both a private line and a commercial line, which is a characteristic transaction in the present invention, will be explained.

Figure 5:
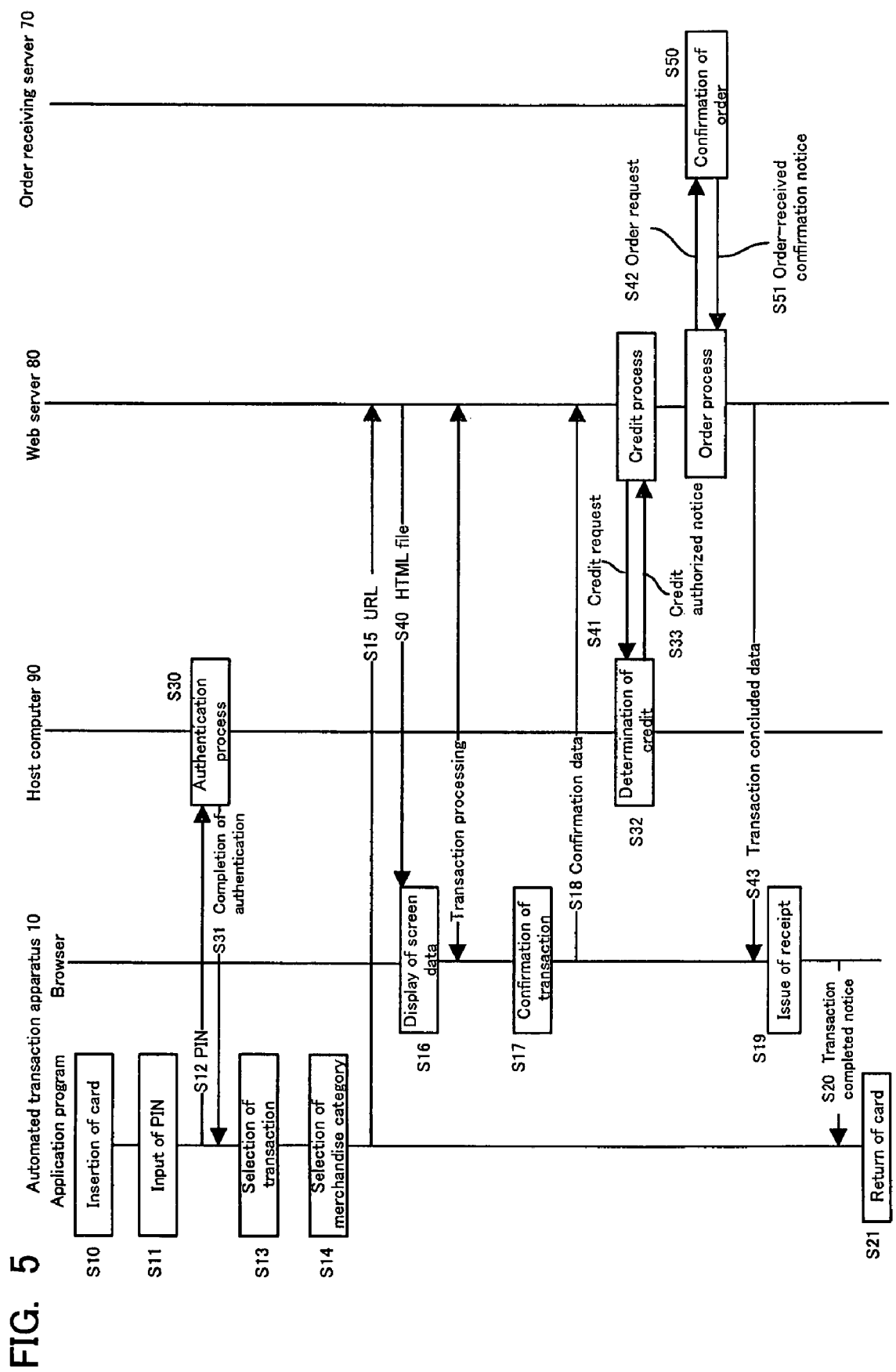
FIG. 5 is a flowchart of the transaction processing in the first embodiment of the present invention.

FIG. 5 is a flowchart of transaction processing in the first embodiment of the present invention. Further, FIGS. 6–15 are examples of screens corresponding to each step of the transaction processing. FIG. 5 will be explained while referring to FIGS. 6–15. Furthermore, a transaction in the first embodiment of the present invention is processed by an Internet browser and an application program of the control unit 11 of an automated transaction apparatus 10.

Figure 6:
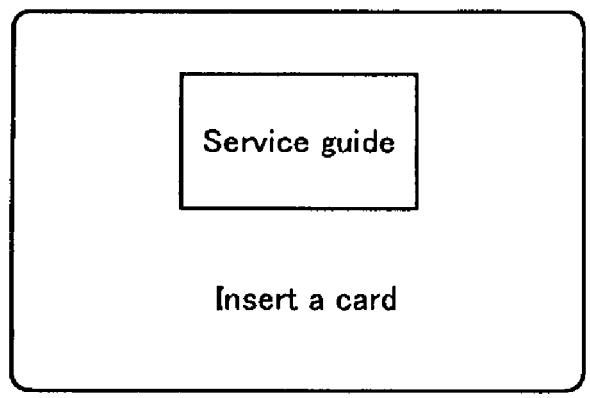
FIG. 6 is an example of a screen displayed on an automated transaction apparatus during the transaction processing.
Figure 7:
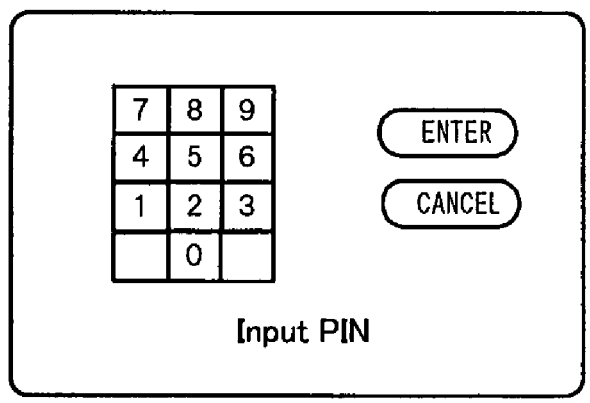
FIG. 7 is an example of a screen displayed on an automated transaction apparatus during the transaction processing.

In FIG. 5, first, the application program detects the insertion of a credit card by a user (S10). The transaction standby screen shown in FIG. 6 is displayed until a credit card is inserted into the card inserting/returning slot 4 by a user. When the application program detects the insertion of a credit card, next, the personal identification number input screen shown in FIG. 7 is displayed. A user inputs his personal identification number by pressing the numbers displayed on the screen.

When the application program detects the input of a personal identification number (S11), it communicates the inputted personal identification number data, and the card number of the inserted credit card to a host computer 90 using a private line (S12). The host computer 90 performs authentication processing of the personal identification number (S30). When the personal identification number is correct, the host computer 90 notifies the automated transaction apparatus 10 of an authentication completed via the private line (S31).

Figure 8:
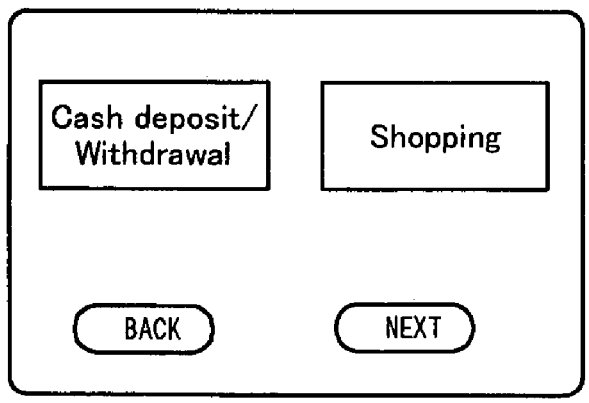
FIG. 8 is an example of a screen displayed on an automated transaction apparatus during the transaction processing.

When the application program of an automated transaction apparatus 10 receives an authentication completed, next, the transaction selection screen shown in FIG. 8 is displayed. In the screen of FIG. 8, when "cash deposit/withdrawal service" is selected, the application program executes a conventional cash deposit/withdrawal transaction explained hereinabove, while communicating with a host computer via a private line. In the first embodiment of the present invention, "shopping" is selected in the screen of FIG. 8.

Figure 9:
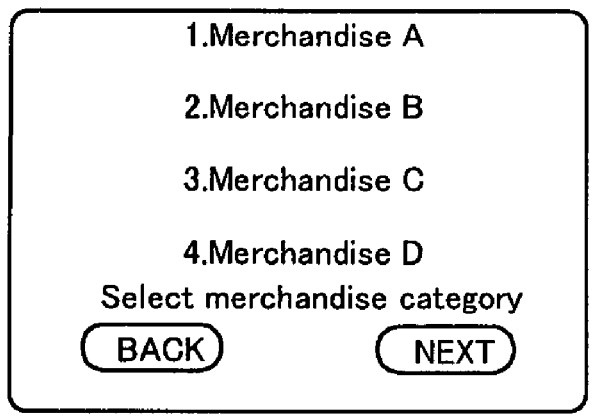
FIG. 9 is an example of a screen displayed on an automated transaction apparatus during the transaction processing.

When the application program detects the selection of "shopping" (S13), next, the merchandise selection screen of FIG. 9 is displayed. In the screen of FIG. 9, a plurality of merchandise categories are displayed. The merchandise categories are, for example, fashion (clothing, and the like), music compact disks, personal computers, and so forth. For each merchandise category, a URL of an Internet sales site, which sells the merchandise thereof, is assigned beforehand. The application program has merchandise categories, and a corresponding table of URLs, which correspond thereto. A user selects a desired merchandise category.

When the application program detects the selection of a merchandise category by a user screen operation (S14), the application program sends a URL corresponding to the selected merchandise category to a Web server 80 using a commercial line (S15). When the application program sends the URL, it enters a standby state until the Internet transaction is complete.

Figure 10:
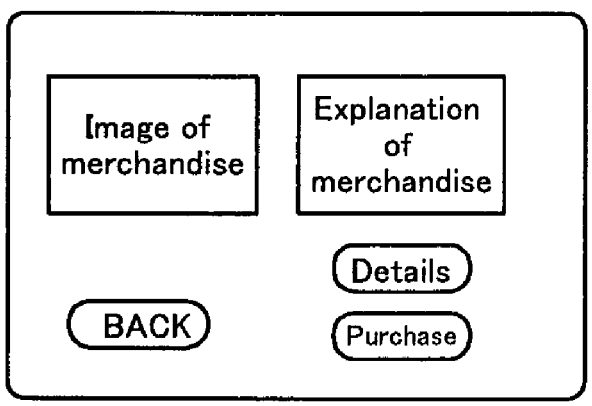
FIG. 10 is an example of a screen displayed on an automated transaction apparatus during the transaction processing.

The Web server 80 sends to the automated transaction apparatus 10 screen data (an HTML file) corresponding to the received URL (S40). The screen data is processed by an Internet browser of the automated transaction apparatus 10. The browser displays the received screen data (S16). A URL, which the application program sends to a Web server, is a URL of screen data for introducing merchandise in each merchandise category. Therefore, the browser first displays a merchandise introduction screen. FIG. 10 is an example of a merchandise introduction screen.

Figure 11:
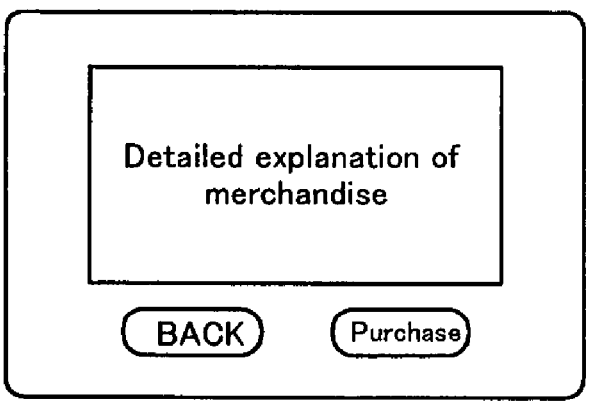
FIG. 11 is an example of a screen displayed on an automated transaction apparatus during the transaction processing.

Thereafter, the user carries out a merchandise purchasing transaction with the Web server while operating a screen. The browser sends the Web server 80 a prescribed request in accordance with a user operation, and the Web server 80 sends to the automated transaction apparatus 10 screen data corresponding to this request. For example, when a user presses "details" on the screen of FIG. 10, the browser sends the Web server 80 a request for detailed data on the merchandise being displayed. The Web server 80 sends to the automated transaction apparatus 10 screen data of the detailed data. FIG. 11 is an example of a screen of merchandise details. Further, when a user presses "purchase" in either FIG. 10 or FIG. 11, the browser sends to the Web server 80 an order request for the merchandise being displayed. The Web server 80 stores the ordered merchandise data, and also sends to the automated transaction apparatus 10 screen data for inputting a merchandise delivery address, and a point-of-contact telephone number. FIG. 12 is an example of an input screen for a delivery address and a point-of-contact telephone number. When the user inputs an address and telephone number, the browser sends this address and telephone number data to the Web server 80. The Web server 80 stores this data, and also sends purchase confirmation screen data to the automated transaction apparatus 10. FIG. 13 is an example of a transaction confirmation screen. In the screen of FIG. 13, there is displayed the name of the ordered merchandise, quantity, purchase price, delivery address, and so forth. In a case in which these transaction conditions are to be confirmed, and an order finalized, the user presses "purchase". Further, in a case in which an order is to be canceled, the user presses "CANCEL".

Figure 14:
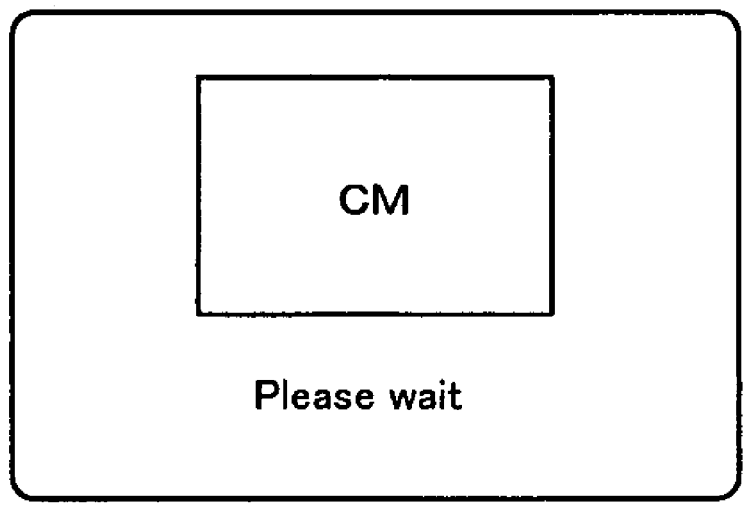
FIG. 14 is an example of a screen displayed on an automated transaction apparatus during the transaction processing.

When "confirm" for transaction confirmation is pressed (S17), the browser sends confirmation data to the Web server 80 (S18). When confirmation data is received, the Web server 80 executes a credit process and an order process, which will be explained hereinbelow. Furthermore, when the browser sends confirmation data to the Web server 80, the browser displays a prescribed processing-in-progress screen until transaction complete screen data is received from the Web server 80. A processing-in-progress screen, for example, is a merchandise or service commercial screen. FIG. 14 is an example of a screen which is being processed.

When confirmation data is received, first, the Web server 80 performs a credit process. More specifically, the Web server 80 sends a credit request comprising a telephone number and pricing data to the host computer 90 using either a commercial line or a private line (S41). The host computer 90 searches for user data on the basis of the telephone number, and extracts user data corresponding to the telephone number that was sent. The host computer 90 makes a determination as to whether or not a credit authorization flag has been set for the credit card number of the extracted user data (S32). In the case in which a credit authorization flag has been set, the host computer 90 confirms that the purchase price is less than the credit limit amount, and sends a credit-authorized notice to the Web server 80 (S33). In the case in which a credit authorization flag has not been set, or the case in which the purchase price exceeds the credit limit amount, a credit not-authorized notice is sent. Further, when a credit request is received, the host computer 90, on the basis of this credit request, lowers the credit authorization flag incorporated in the extracted user data.

When a credit-authorized notice is received, next, the Web server 80 performs an order process.

More specifically, using either a commercial line or a private line, the Web server 80 sends an order request comprising merchandise name and quantity data to an order-receiving server 70 managed by an enterprise that carries the ordered merchandise (S42). Upon receiving an order request, the order-receiving server 70 confirms the contents of the order (merchandise name, quantity) (S50). If the order can be accepted, the order-receiving server 70 sends to the Web server 80 an order-received confirmation notice (S51). In accordance therewith, the transaction is concluded. Furthermore, if the order cannot be accepted, an order-receipt-not-possible notice is sent to the Web server 80.

Figure 15:
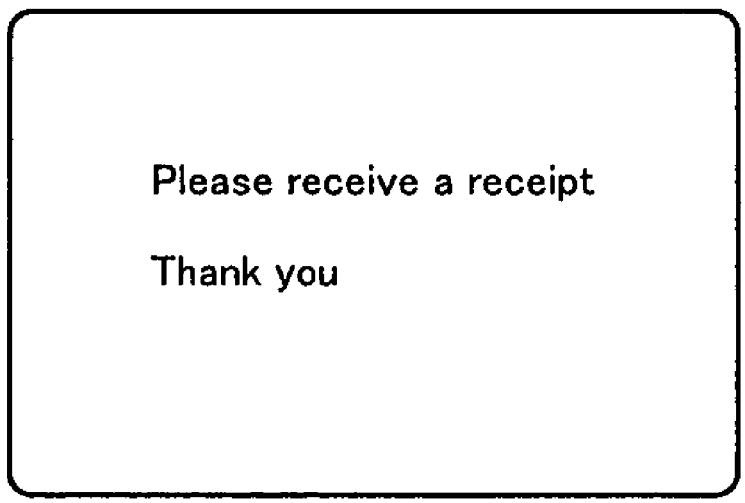
FIG. 15 is an example of a screen displayed on an automated transaction apparatus during the transaction processing.

When an order-received confirmation notice is received, the Web server 80 sends transaction concluded data to the automated transaction apparatus 10 (S43). FIG. 15 is an example of a transaction notice screen.

When transaction concluded data is received, the automated transaction apparatus 10 browser displays the screen of FIG. 15, and also issues from the receipt issuing slot 7 a receipt, on which the transaction contents are printed (S19). Transaction contents comprise a transaction number, transaction date, merchandise name, telephone number, delivery address, and so forth. When a receipt is issued, the browser notifies the application program that the transaction has been completed (S20). When the application program detects "transaction complete", it returns the credit card from the card inserting/returning slot 4 (S21).

In this manner, according to the first embodiment of the present invention, a transaction, in which data requiring high security is communicated, and an authentication process of a personal identification number is carried out using a private line. Further, a merchandise purchasing transaction is carried out via a commercial line. Therefore, an automated transaction apparatus of the present invention can communicate data requiring high security via a private line without performing encryption processing, and can provide a variety of services, such as merchandise sales services, using a commercial line.

Figure 16:
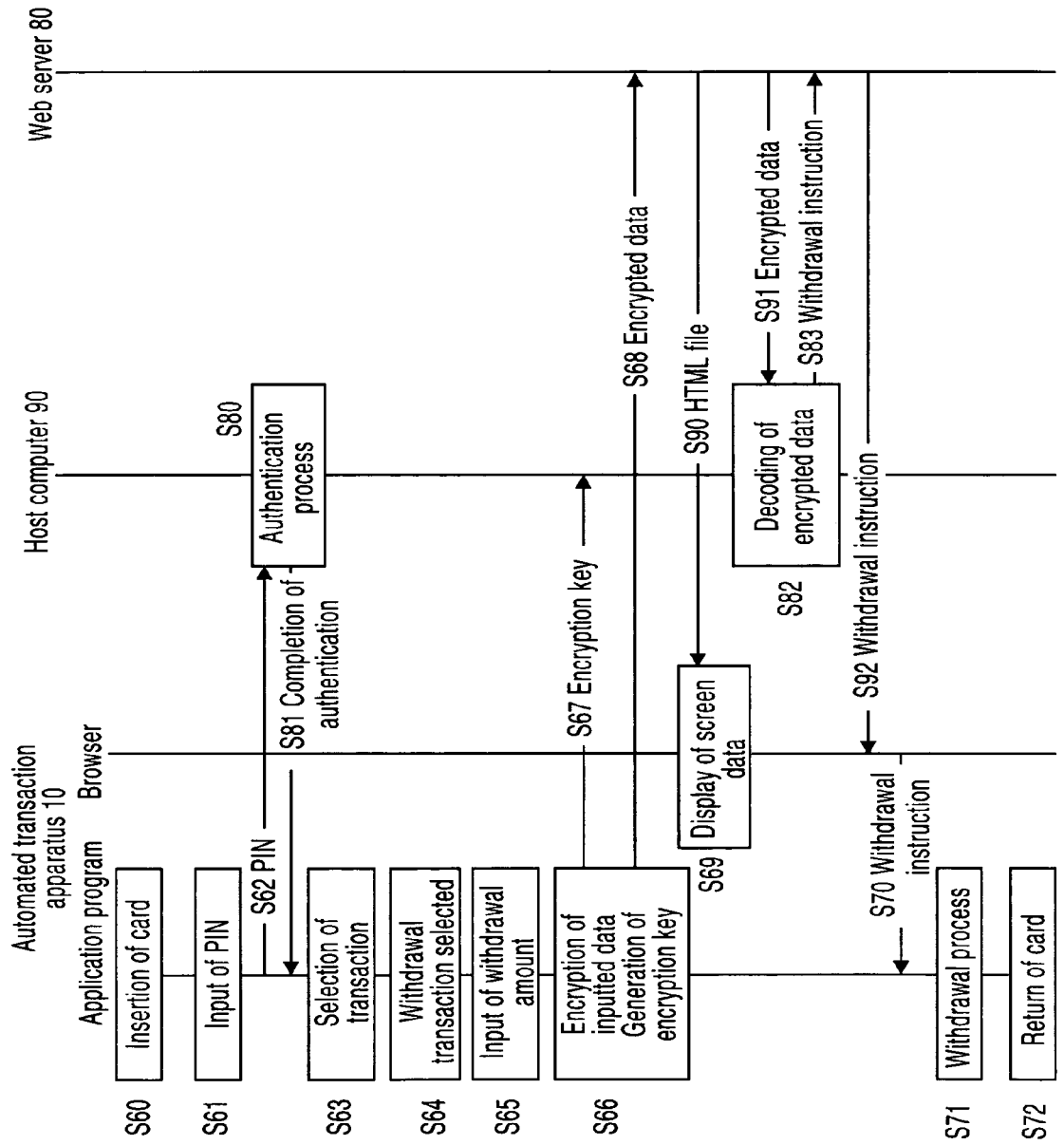
FIG. 16 is a flowchart of a transaction processing in a second embodiment of the present invention.

FIG. 16 is a flowchart of a second embodiment of the present invention. Transaction processing of the second embodiment will be explained using the example of a withdrawal process in a cash transaction. In FIG. 16, first, the application program detects the insertion of a cash card by a user (S60). When the insertion of the cash card is detected, next, the application program displays the personal identification number input screen shown in the above-mentioned FIG. 7. The user presses the numbers displayed on the screen, and inputs a personal identification number.

When the application program detects the input of a personal identification number (S61), the application program notifies the inputted personal identification number data, and the card number of the inserted credit card to the host computer 90 using a private line (S62). The host computer 90 performs authentication processing of the personal identification number (S80). When the personal identification number is correct, the host computer 90 notifies the automated transaction apparatus 10 of an authentication completed via the private line (S81).

When the application program of an automated transaction apparatus 10 receives an authentication completed, next, the transaction selection screen shown in the above-mentioned FIG. 8 is displayed. In the screen of FIG. 8, when "cash deposit/withdrawal service" is selected (S63), and then the withdrawal transaction thereof is selected (S64), the above-mentioned withdrawal transaction is started. At this point, as usual, the application program monitors the line status of the private line, and makes a determination that the private line is busy.

The user inputs a withdrawal amount (S65). Once this is done, the application program encrypts the inputted data (amount of withdrawal), and then generates an encryption key for decoding this encrypted data (S66). Then, the application program sends the encryption key, which comprises a relatively small amount of data, to the host computer 90 via the private line (S67), and sends the encrypted data, which comprises a relatively large amount of data, to a prescribed URL address of a Web server via the commercial line (S68). Furthermore, both the encryption key and the encrypted data are sent with a prescribed transaction identification code attached.

When the encrypted data is received, the Web server 80 sends to the automated transaction apparatus 10 screen data (an HTML file) corresponding to the specified URL (S90). The screen data is processed by an Internet browser of the automated transaction apparatus 10. The browser displays the received screen data (S69). This screen data, for example, is a screen indicating that processing is in progress.

Further, when the Web server 80 receives the encrypted data, it sends same to the host computer 90 (S91). When the host computer 90 acquires the encrypted data from the Web server 80, the host computer 90 selects the corresponding encryption key in accordance with a transaction identification code, and uses same to decode the encrypted data (S82).

The host computer 90 sends to the Web server 80 an authorization notice when the requested amount of the withdrawal is authorized on the basis of the decoded data (S83). The Web server 80, upon receiving an authorization notice, sends a withdrawal instruction notice to the automated transaction apparatus 10 (S92). When the automated transaction apparatus 10 browser receives a withdrawal instruction notice, the browser notifies the application program of the withdrawal instructions (S70). The application program controls a cash handling device 52, extracts the withdrawal amount's worth of cash from the cash storage unit inside the automated transaction apparatus, discharges the cash to the cash inserting/dispensing slot 6 (S71), and also returns the cash card via the card inserting/returning slot 4, and discharges a receipt from the receipt issuing slot 7 (S72).

In this manner, according to the processing of the second embodiment, when the private line is busy, data requiring high security, which essentially should be sent via the private line, is encrypted, the encrypted data is sent to a Web server via a commercial line, and is then sent to a host computer from the Web server. An encryption key for decoding the encrypted data is sent to the host computer via the private line at this time. Therefore, since only the encryption key, which comprises a relatively small amount of data, is sent via the private line, the load on the private line can be reduced. Furthermore, because the encryption key is sent by private line, high security is also ensured since the encrypted data sent via the commercial line cannot be decoded. Further, the above-mentioned transaction processing of the second embodiment is effective in a case in which a relatively large amount of data (for example, system operational data, and the like) is sent using a commercial line instead of a private line in order to reduce private line utilization costs.

Further, in a second aspect of the embodiment, withdrawal instruction data sent from a host computer 90 to an automated transaction apparatus 10 via a Web server 80 can be encrypted using the same encryption key. Since the automated transaction apparatus 10 retains the encryption key generated in Step S66, this encryption key can be used to decode the encrypted data.

Further, when an automated transaction apparatus communicates data requiring high security to a Web server via a commercial line, the automated transaction apparatus encrypts the data, and prepares an encryption key for decoding this encrypted data the same as described hereinabove.

Then, as described hereinabove, the automated transaction apparatus sends the encrypted data to a Web server via a commercial line, and sends the encryption key to a host computer via a private line. The host computer sends the received encryption key to the Web server, and the Web server acquires the encryption key from the host computer. Even in a case such as this, it is possible to ensure high security for data sent via a commercial line.

Host computer 90 is a host computer of a certain specific financial institution, but host computer 90 is capable of connecting to a host computer of another financial institution via a financial institution mutual network. Therefore, a user can utilize host computer 90 to engage in transactions with a host computer of another financial institution as well.

According to the present invention as described heretofore, there is provided an automated transaction apparatus, which is capable of connecting to both a private line and a commercial line. Therefore, by using a private line to communicate data requiring high security, it becomes possible to provide a variety of services that utilize a commercial line comprising the Internet without encrypting data.

Further, even in a case in which encrypted data is sent via a commercial line, since an encryption key for decoding this encrypted data is sent via a private line, the high security of the data is guaranteed.

The scope of protection for the present invention is not limited to the above-mentioned embodiments, but rather extends to any equivalents thereof.

What is claimed:

1. An automated transaction apparatus for processing a first transaction including a withdrawal transaction, and a second transaction with a user by using a card, comprising:

a first line unit for enabling communications with a first data processing device connected via a private line;

a second line unit for enabling communication with a second data processing device connected via a commercial line including the Internet;

an operating unit for enabling the user to select either said first transaction or said second transaction; and a controller for controlling to perform said first transaction including the withdrawal transaction by connecting with said first data processing device through the first line unit when said first transaction is selected by said operating unit and for controlling to perform said second transaction by connecting said second data processing device through the second line unit when said second transaction is selected by said operating unit, wherein said controller encrypts data related to said first transaction requiring processing by said first data processing device, generates an encryption key for decoding said encrypted data, sends said encryption key to said first data processing device, sends said encrypted data to said second data processing device, and causes said second data processing device to send said encrypted data to said first data processing device.

2. The automated transaction apparatus according to claim 1, wherein said controller encrypts data related to said second transaction requiring processing by said second data processing device, generates an encryption key for decoding said encrypted data, sends said encryption key to said first data processing device, sends said encrypted data to said second data processing device, and causes said first data processing device to send said encryption key to said second data processing device.

* * * * *